(12) United States Patent
Ishihara et al.

(10) Patent No.: US 8,271,191 B2
(45) Date of Patent: Sep. 18, 2012

(54) METHOD OF DETECTING ERRONEOUS GPS GROUND SPEED ON GROUND

(75) Inventors: Yasuo Ishihara, Kirkland, WA (US); Kevin J Conner, Kent, WA (US); Steve C. Johnson, Issaquah, WA (US)

(73) Assignee: Honeywell International Inc., Morristown, NJ (US)

( * ) Notice: Subject to any disclaimer, the term of this patent is extended or adjusted under 35 U.S.C. 154(b) by 1369 days.

(21) Appl. No.: 11/426,547

(22) Filed: Jun. 26, 2006

(65) Prior Publication Data

US 2007/0299608 A1 Dec. 27, 2007

(51) Int. Cl.
*G01C 23/00* (2006.01)

(52) U.S. Cl. ........ 701/412; 701/495; 701/470; 701/468; 340/945; 340/947; 342/36

(58) Field of Classification Search ............. 701/9, 206, 701/213, 3, 301, 120; 340/945, 947; 342/357.09, 342/36
See application file for complete search history.

(56) References Cited

U.S. PATENT DOCUMENTS

| | | | |
|---|---|---|---|
| 5,745,054 A | 4/1998 | Wilkens | |
| 6,005,513 A * | 12/1999 | Hardesty | 342/357.34 |
| 6,388,613 B1 * | 5/2002 | Nagatsuma et al. | 342/357.42 |
| 6,654,685 B2 * | 11/2003 | McIntyre | 701/472 |
| 6,785,594 B1 | 8/2004 | Bateman et al. | |
| 6,865,453 B1 * | 3/2005 | Burch et al. | 701/4 |
| 6,898,492 B2 * | 5/2005 | de Leon et al. | 701/32.4 |
| 6,983,206 B2 * | 1/2006 | Conner et al. | 701/301 |
| 7,079,951 B2 * | 7/2006 | Conner et al. | 701/301 |
| 7,206,698 B2 * | 4/2007 | Conner et al. | 701/301 |
| 7,363,145 B2 * | 4/2008 | Conner et al. | 701/120 |
| 7,565,260 B2 * | 7/2009 | Yun et al. | 702/151 |
| 7,587,278 B2 * | 9/2009 | Poe et al. | 701/301 |
| 7,702,461 B2 * | 4/2010 | Conner et al. | 701/301 |
| 2003/0193411 A1 | 10/2003 | Price | |
| 2005/0128129 A1 * | 6/2005 | Conner et al. | 342/36 |
| 2006/0161336 A1 | 7/2006 | Wischmeyer | |
| 2007/0299608 A1 * | 12/2007 | Ishihara et al. | 701/213 |

* cited by examiner

*Primary Examiner* — Thomas G. Black
*Assistant Examiner* — Wae Louie
(74) *Attorney, Agent, or Firm* — Lowe Graham Jones PLLC

(57) ABSTRACT

Methods and systems for determining reliability of Global Positioning System (GPS) ground speed. An example system receives GPS track information and GPS ground speed, determines a change in GPS track information and determines reliability of the GPS ground speed based on the determined change in GPS track information relative to the GPS ground speed. The system sets a GPS ground speed based on the determined reliability. A GPS ground speed output is set to zero, if the GPS ground speed is determined unreliable and the GPS ground speed output is set to the GPS ground speed, if the GPS ground speed is determined reliable. The system sends the GPS ground speed output to a Runway Awareness and Advisory System (RAAS). Also, the system sets the GPS ground speed output to zero, if a received GPS ground speed validity signal or a received GPS track validity signal indicate invalid.

13 Claims, 3 Drawing Sheets

METHOD OF DETECTING ERRONEOUS GPS GROUND SPEED ON GROUND

BACKGROUND OF THE INVENTION

A Runway Awareness and Advisory System (RAAS) locates aircraft with respect to airport runways and taxiways and generates and annunciates conflict awareness advisories as a function of determining that a conflict exists. One type of conflict awareness advisories is an "On Taxiway" advisory that is produced if the aircraft exceeds a speed threshold while still on a taxiway. If the speed threshold is exceeded, the RAAS assumes the pilot is trying to take-off from the taxiway.

Currently, false "On Taxiway" advisories may be produced because of erroneous Global Positioning System (GPS) ground speed data provided by some GPS devices. When the aircraft is not moving, some GPS receivers output erroneous ground speed. If this erroneous ground speed exceeds the speed threshold, a false advisory, such as RAAS "On Taxiway", is produced.

Therefore, there exists a need for reducing false "On Taxiway" advisories.

SUMMARY OF THE INVENTION

The present invention provides methods and systems for determining reliability of Global Positioning System (GPS) ground speed. An example system receives GPS track information and GPS ground speed, determines a change in GPS track information and determines reliability of the GPS ground speed based on the determined change in GPS track information relative to the GPS ground speed.

The system sets a GPS ground speed based on the determined reliability. A GPS ground speed output is set to zero, if the GPS ground speed is determined unreliable. The GPS ground speed output is set to the GPS ground speed, if the GPS ground speed is determined reliable.

In one aspect of the invention, the system sends the GPS ground speed output to a Runway Awareness and Advisory System (RAAS).

In another aspect of the invention, the system sets the GPS ground speed output to zero, if a received GPS ground speed validity signal or a received GPS track validity signal indicate invalid.

BRIEF DESCRIPTION OF THE DRAWINGS

The preferred and alternative embodiments of the present invention are described in detail below with reference to the following drawings.

DETAILED DESCRIPTION OF THE PREFERRED EMBODIMENT

Figure 1:
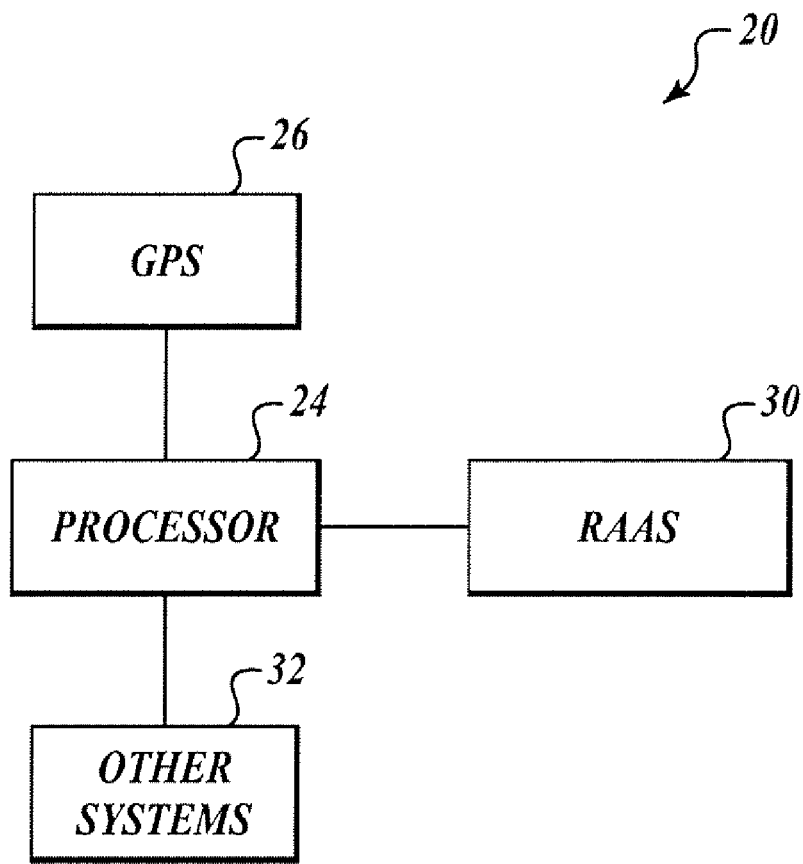
FIG. 1 illustrates a block diagram of an example system formed in accordance with an embodiment of the present invention.

FIG. 1 illustrates an example aircraft system 20 for detecting erroneous Global Positioning System (GPS) ground speed data that is supplied to various other aircraft systems, such as a Runway Awareness and Advisory System (RAAS) 30. The system 20 includes a processor 24 that receives data from a GPS 26 and other aircraft systems 32, such as an Inertial Reference System (IRS), a Flight Management System (FMS), a magnetic heading sensor or aircraft configuration sensors.

The processor 24 receives track and ground speed information from the GPS 26 and determines if the GPS ground speed is reasonable. If the processor 24 determines that the aircraft is on the ground according to information received from any of the other aircraft systems 32, such as a weight on wheels switch, a ground speed value outputted to the RAAS 30 or other systems, such as an Enhanced Ground Proximity Warning System, is set to 0, if it was determined that the GPS ground speed was invalid or unacceptable. Information retrieved from the other aircraft systems 32 may be supplied via a direct connection to the processor 24 or via a data bus, such as an ARINC 429 bus.

The functions performed by the processor 24 may be included in various components of the system 20 such as the RAAS 30 or a Terrain Awareness and Warning System. For example, the RAAS 30 may be modified to incorporate the functionality provided as described above as long as the RAAS 30 is in data communication with the GPS 26 and the other aircraft systems 32.

Figure 2:
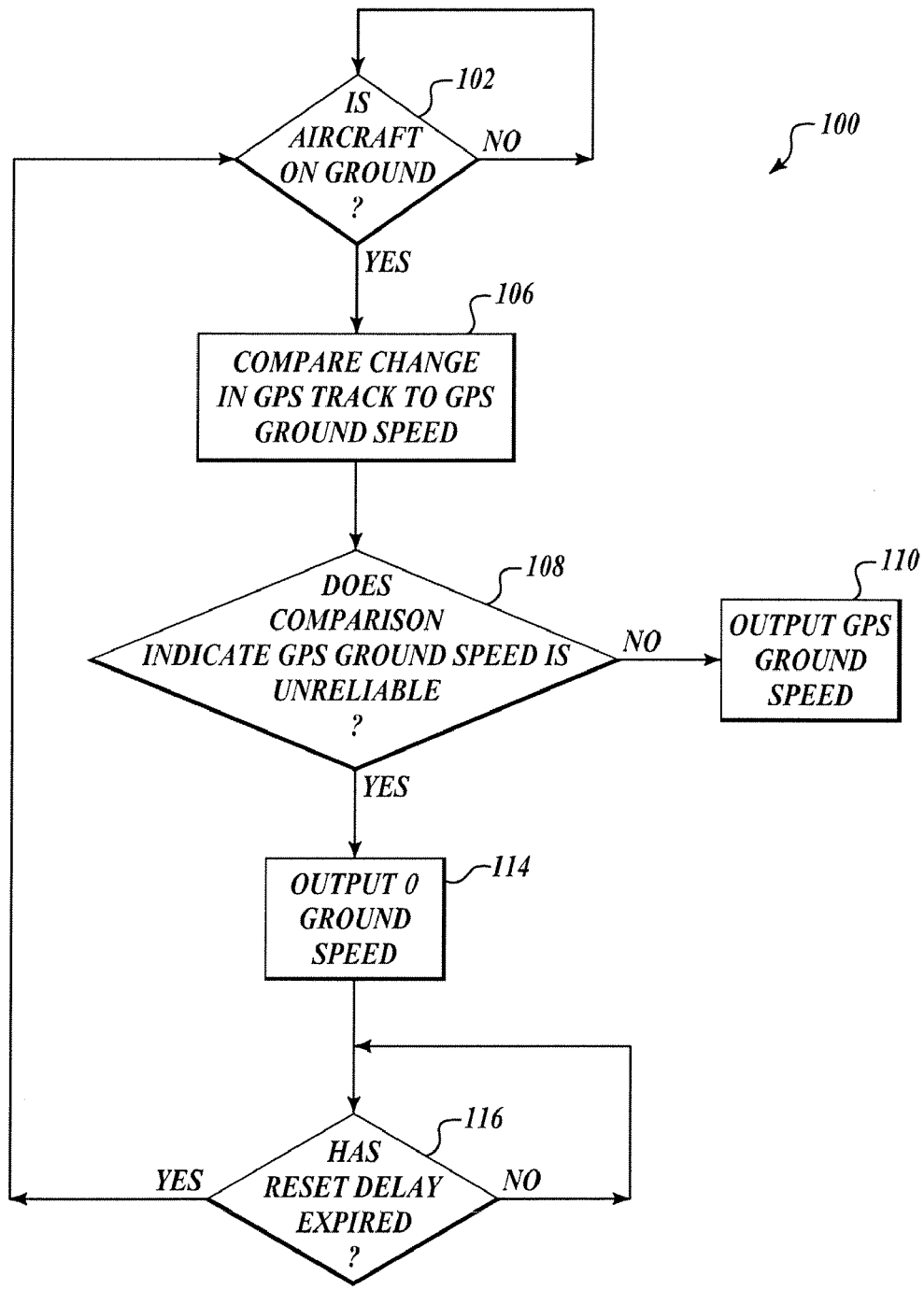
FIG. 2 illustrates an example flow diagram performed by the system shown in FIG. 1 in accordance with an embodiment of the present invention.

FIG. 2 illustrates an example process 100 performed by the system 20 shown in FIG. 1. First, at a decision block 102, the processor 24 determines if the aircraft is on the ground. In one example, this is done by reception of a signal generated by a weight-on-wheels switch. If it is determined that the aircraft is not on the ground, the determination performed at the decision block 102 is repeated. If it is determined that the aircraft is on the ground, then at a block 106, the processor 24 compares a change in GPS track information and GPS ground speed to a predefined threshold.

Next, at a decision block 108, the processor 24 determines if the comparison performed at block 106 indicates that the GPS ground speed is unreliable. If the GPS ground speed is determined to be reliable, then at a block 110, the GPS ground speed data is outputted to the RAAS 30. If the comparison performed at block 106 indicates that the GPS ground speed is unreliable, then at block 114, the ground speed value is set to 0 and outputted to the RAAS 30. Next, at a decision block 116, the processor 24 determines if a reset delay period has expired after the setting of the ground speed to 0. If the delay period has not expired, the delay process waits until it has. Once the delay period has expired, the process 100 returns to the decision block 102 to repeat.

In one embodiment, the processor 24 compares a compass heading received form other aircraft sensors to GPS track information. The processor 24 determines the GPS ground speed is unreliable if the comparison shows that the heading and GPS track information differ by more than a threshold amount, for example 10 degrees.

Figure 3:
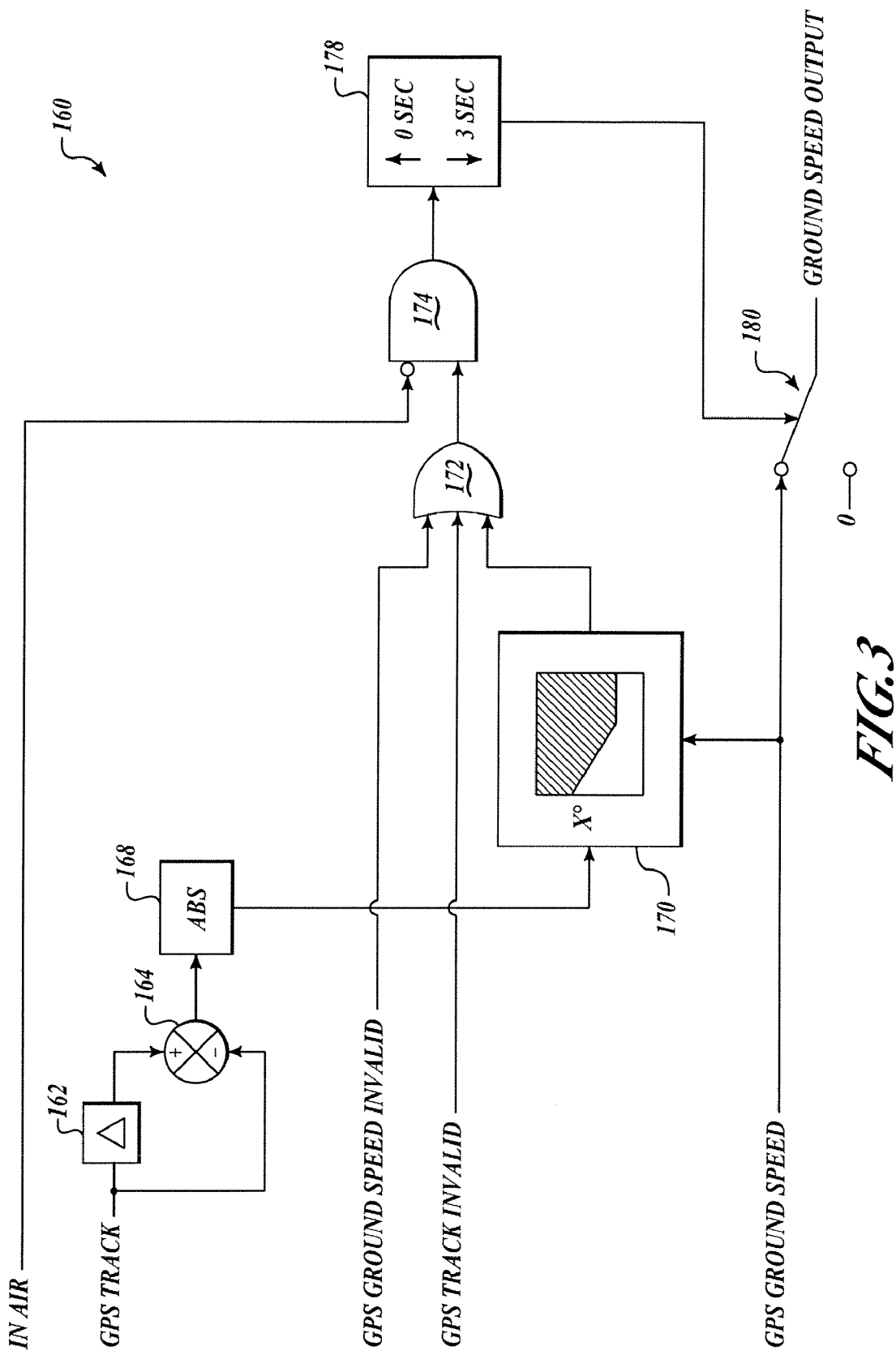
FIG. 3 illustrates a logic diagram of the process that is shown in FIG. 2.

FIG. 3 illustrates a logic diagram 160 of a specific example of the process 100 of FIG. 2 as performed by the system 20 of FIG. 1. A difference in GPS track value is created by first taking the difference at a comparator 164 between consecutive GPS track values (see delay block 162), then taking the absolute value at block 168 of the result of comparator 164. At a block 170, the change in GPS track (X°-y-axis) and the present GPS ground speed (x-axis) are mapped onto a predefined graph in order to determine if the GPS ground speed is valid or not. The predefined graph allows for larger variations or change in GPS track at lower ground speed values. Thus, when the change in GPS track is in an unacceptable (shaded) region of the graph, the GPS track is unreliable for the present ground speed, thereby generating a logic 1 output.

Of course, if the change in GPS track is in an acceptable (unshaded) region of the graph, the GPS track information is stable relative to the GPS ground speed and the output of block 170 is a logic 0. An OR gate 172 receives the output of the comparison block 170, a GPS ground speed invalid logic signal, and a GPS track invalid logic signal. Thus, the output of the OR gate 172 is a logic 1 if any of the GPS ground speed logic invalid signal, the GPS track logic invalid signal, or the output of the comparison block 170 is a logic 1. The GPS ground speed invalid logic signal and the GPS track invalid logic signal are produced and sent by the GPS 26. An AND gate 174 receives the output of the OR gate 172 as well as an inversion of an In Air signal. An alternative for the inversion of the In Air signal is an On Ground signal, such as that produced by a weight-on-wheels switch or similar device that produces an aircraft on ground signal. Therefore, the AND gate 174 produces a logic 1 if it is determined that the aircraft is on the ground and either the GPS ground speed invalid signal is a logic 1, the GPS track invalid signal is a logic 1, or the comparison (block 170) indicates that the GPS ground speed information is unreliable. If the output of the AND gate 174 is a logic 1, the output of the ground speed is switched to 0 at a switch 180 without delay, otherwise the GPS ground speed is the outputted ground speed value. At a delay block 178, the output of the AND Gate 174 is delayed by a predefined period, such as 3 seconds, if the output of the AND gate 174 toggles to a logic 1.

In one example, at 0 ground speed, the acceptable change in GPS track is less than or equal to 30°. The change in the acceptable limit of GPS track drops to 25° once the GPS ground speed reaches 40 knots.

While the preferred embodiment of the invention has been illustrated and described, as noted above, many changes can be made without departing from the spirit and scope of the invention. For example, the functions performed in FIG. 3 may be performed using software, hardware, or a combination of hardware and software. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method for determining reliability of Global Positioning System (GPS) ground speed, the method comprising:
   at a processing device,
   receiving GPS track information and GPS ground speed;
   determining a change in GPS track information over a predefined time delay;
   determining reliability of the GPS ground speed based on the determined change in GPS track information relative to the GPS ground speed,
   wherein the GPS ground speed is determined reliable if the change in GPS track information does not differ by more than a threshold amount, wherein the threshold amount is based on the GPS ground speed;
   setting a GPS ground speed based on the determined reliability; and
   setting the GPS ground speed output to zero, if the GPS ground speed is determined unreliable.

2. The method of claim 1, further comprising setting the GPS ground speed output to the GPS ground speed, if the GPS ground speed is determined reliable.

3. The method of claim 2, further comprising sending the GPS ground speed output to a Runway Awareness and Advisory System (RAAS).

4. The method of claim 2, further comprising sending the GPS ground speed output to an Enhanced Ground Proximity Warning System.

5. The method of claim 2, further comprising:
   receiving at least one of a GPS ground speed validity signal and a GPS track validity signal; and
   setting the GPS ground speed output to zero, if at least one of the GPS ground speed validity signal or the GPS track validity signal indicates invalid.

6. The method of claim 5, further comprising sending the GPS ground speed output to a Runway Awareness and Advisory System (RAAS).

7. A system for determining reliability of Global Positioning System (GPS) ground speed, the system comprising:
   a first means for receiving GPS track information and GPS ground speed;
   a second means for determining a change in GPS track information over a predefined time delay;
   a third means for determining reliability of the GPS ground speed based on the determined change in GPS track information relative to the GPS ground speed,
   wherein the GPS ground speed is determined reliable if the change in GPS track information does not differ by more than a threshold amount, wherein the threshold amount is based on the GPS ground speed; and
   a fourth means for setting a GPS ground speed based on the determined reliability, the fourth means sets the GPS ground speed output to zero, if the GPS ground speed is determined unreliable.

8. The system of claim 7, wherein the fourth means sets the GPS ground speed output to the GPS ground speed, if the GPS ground speed is determined reliable.

9. The system of claim 8, further comprising a fifth means for sending the GPS ground speed output to a Runway Awareness and Advisory System (RAAS).

10. The system of claim 9, further comprising:
    a fifth means for receiving at least one of a GPS ground speed validity signal and a GPS track validity signal,
    wherein the fourth means sets the GPS ground speed output to zero, if one of the GPS ground speed validity signal or the GPS track validity signal indicates invalid.

11. The system of claim 10, further comprising a sixth means for sending the GPS ground speed output to a Runway Awareness and Advisory System (RAAS).

12. The system of claim 7, wherein the first, second, and third means are included in a Runway Awareness and Advisory System (RAAS).

13. The system of claim 7, wherein the first, second, and third means are included in an Enhanced Ground Proximity Warning System.

* * * * *